Aug. 19, 1958 S. M. DAVEY ET AL 2,847,810
MEANS FOR PACKAGING
Filed Feb. 8, 1954 8 Sheets-Sheet 1

FIG. 1

INVENTORS.
Sidney M. Davey,
John G. Anderson.
BY
Harness, Dickey & Pierce
ATTORNEYS.

Aug. 19, 1958 S. M. DAVEY ET AL 2,847,810
MEANS FOR PACKAGING
Filed Feb. 8, 1954 8 Sheets-Sheet 3

INVENTORS.
Sidney M. Davey,
John G. Anderson.
BY
Harness, Dickey & Pierce
ATTORNEYS.

Aug. 19, 1958 S. M. DAVEY ET AL 2,847,810
MEANS FOR PACKAGING
Filed Feb. 8, 1954 8 Sheets-Sheet 4

INVENTORS.
Sidney M. Davey,
John G. Anderson.
BY
Harness, Dickey & Pierce
ATTORNEYS.

Aug. 19, 1958

S. M. DAVEY ET AL 2,847,810

MEANS FOR PACKAGING

Filed Feb. 8, 1954

INVENTORS.
Sidney M. Davey,
John G. Anderson.
BY
ATTORNEYS.

Aug. 19, 1958  S. M. DAVEY ET AL  2,847,810
MEANS FOR PACKAGING
Filed Feb. 8, 1954  8 Sheets-Sheet 7

INVENTORS
Sidney M. Davey,
John G. Anderson.
BY
Harness, Dickey & Pierce
ATTORNEYS.

Aug. 19, 1958  S. M. DAVEY ET AL  2,847,810
MEANS FOR PACKAGING
Filed Feb. 8, 1954  8 Sheets-Sheet 8

INVENTORS.
Sidney M. Davey,
John G. Anderson.
BY
Harness, Dickey & Pierce
ATTORNEYS.

United States Patent Office 2,847,810
Patented Aug. 19, 1958

2,847,810

MEANS FOR PACKAGING

Sidney M. Davey, Ferndale, and John G. Anderson, Southfield Township, Oakland County, Mich.; said Anderson assignor to said Davey Application February 8, 1954, Serial No. 408,894

18 Claims. (Cl. 53—198)

This invention relates to packaging machines for packaging, and more particularly to machines for packaging articles such as paper money in predetermined sums.

The practice of packaging paper money for quick handling and distribution of round sums is in wide use in banks and similar institutions which have a constant demand for such transactions. Usually these packages comprise bills of the needed amounts totalling the required figure, these bills being stacked and wrapped with a band on which the total is marked. It has been customary in the past to do this packaging on an individual basis, with operators who count out the individual bills, place them in a stack and slip the stack into a preformed band. This process has been found to be inefficient and time-consuming, and is especially unsatisfactory during rush hours when institutions such as banks must hand out large amounts of money in a small space of time. The conventional hand packaging process is also unsatisfactory in that it is subject in great extent to human error, since there is no simple mechanical procedure which must be followed in packaging the bills.

It is an object of the present invention to overcome the disadvantages of previous methods of packaging paper money and to provide an improved device whereby this packaging may be done with extreme rapidity and with a minimum chance of error.

It is a further object to provide a packaging machine of the above nature which eliminates operators if desired, and if operators are used reduces the actions required by the operators to a minimum, providing a simple mechanical procedure for each operator which is the same no matter what the value and number of bills in the package may be.

It is a further object to provide an improved packaging machine having the above characteristics which is versatile in operation and which can be used to make packages of widely different numbers and denominations of bills.

It is another object to provide an improved packaging machine of the above nature in which the bills will be held firmly by the surrounding band after the package is formed.

It is also an object to provide an improved packaging machine of the above nature which includes conveyor means by which the packages are carried to succeeding stations, and in which automatic means is provided, if desired, for placing a bill on the stack as it arrives at each station.

It is a further object to provide a novel and improved method for packaging objects such as stacked paper bills, in which the package will inherently cause the bills to be firmly held by virtue of their configuraiton during the packaging process.

Other objects, features, and advantages of the present invention will become apparent from the subsequent description, taken in conjunction with the accompanying drawings.

In the drawings:

Figure 3 is a top plan view of a machine with the automatic loading means removed and with parts broken away for clarity, showing the location of the band transfer mechanism;

Figure 7 is a detailed elevational view of the band folding mechanism showing the means for causing overlapping of the band ends;

Figure 1:
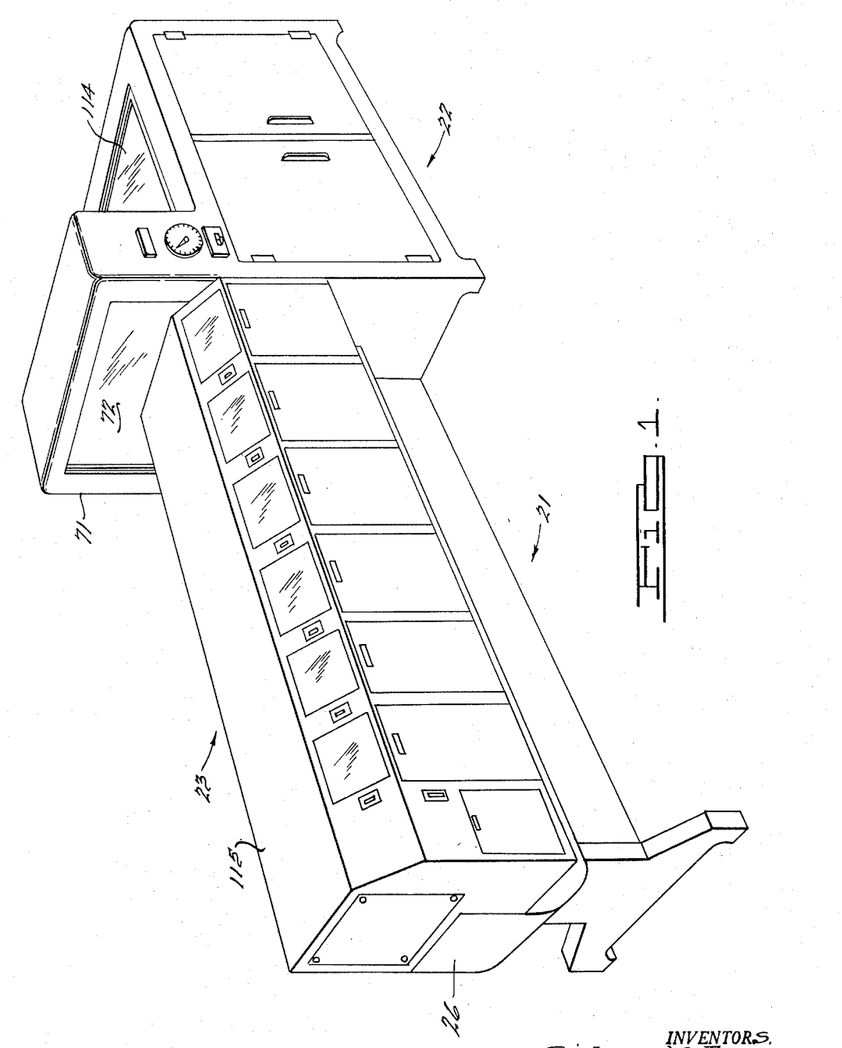
Figure 1 is a perspective view of a preferred embodiment of the packaging machine of this invention showing the automatic loading means provided at the stations.

The device consists of a loading section generally indicated at 21 and a wrapping section generally indicated at 22, these sections being in tandem relation and adapted to be supported on a floor or similar surface. As shown in Figure 1, loading section 21 is provided with an automatic loading mechanism generally indicated at 23 which surmounts the loading section. It will be understood however that the invention may be practiced without such automatic loading mechanism, the bills being placed in the packaging machine by operators standing at stations alongside loading section 21. For this reason the device will be described at first without reference to the details of the loading mechanism which, as will be seen later, does not interfere with or change the operational characteristics of the packaging machine itself.

Figure 2:
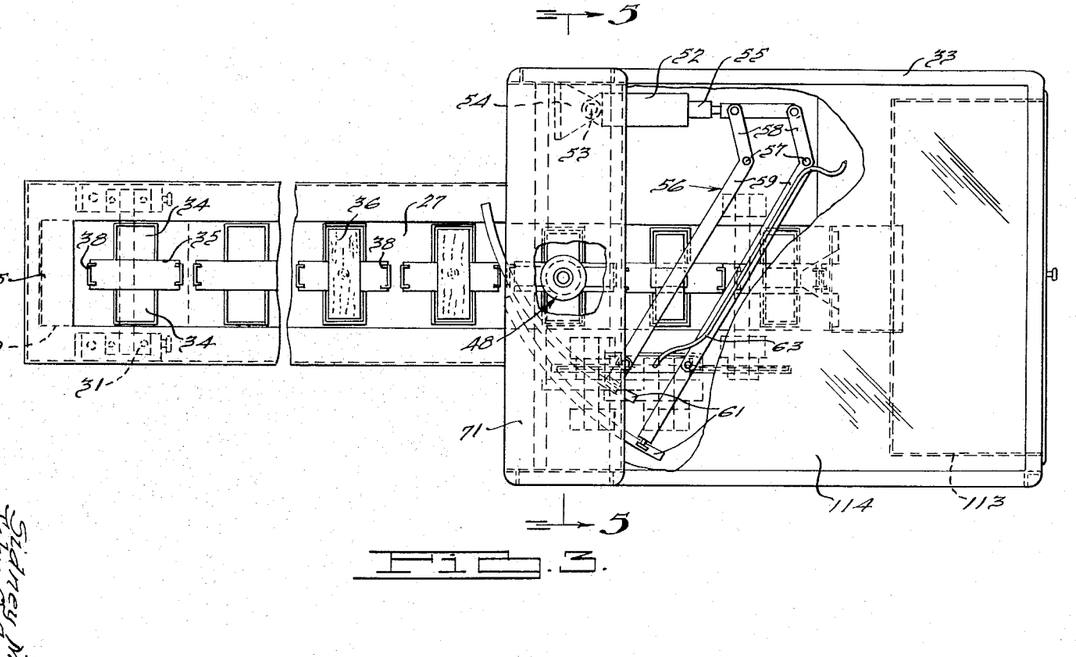
Figure 2 is a side elevational view in cross section generally at the longitudinal center line of the machine and with the automatic loading means removed, showing the conveyor drive and the band wrapping mechanism.

As seen in Figure 2, loading section 21 is supported by a base 24 and the top 25 thereof is preferably at a height which is convenient for operators standing or sitting alongside the machine. A housing 26 is provided for the loading section which is of elongated shape, and an endless conveyor belt 27 is mounted in the machine, the top of the belt being movable longitudinally flush with the top 25 of the loading section and being supported by a bed plate 28. Belt 27 is supported by an idler pulley 29 held by bearings 31 within housing 26, and a driving pulley 32 within housing 33 of wrapping section 22. Belt 27 carries a plurality of trays in longitudinally spaced relation, each tray being made up of laterally spaced sections 34 as seen in Figure 3. A rectangular aperture 35 is formed in belt 27 between the sections 34 of each tray, the longer dimension of each aperture 35 being in the direction of the belt. The size and disposition of tray sections 34 are such as to closely hold paper money 36 in stacked relation, and the bottoms of tray sections 34 are slightly convex upwardly as is best seen in Figure 7. The shape of apertures 35 is such as to conform to the shape of bands 37 which in operation are placed in flat condition across the stacks of bills as seen in Figure 7. Guides 38 are fixed to belt 27 at the opposite ends of apertures 35 to hold bands 37 in proper position during wrapping.

Means are provided for intermittently moving belt 27 so that tray sections 34 are moved to successive stations in loading section 21. It will be noted that the length of loading section 21 may be varied to suit individual requirements so that as many stations as required may be provided for. The driving mechanism in the illustrated embodiment is shown in Figure 2 and comprises a motor 39 within the lower portion of housing 33 which drives a Geneva stop mechanism 41. A belt 42 connects the Geneva stop mechanism to pulley 32 by means of sprockets 43 and 44. The transmission ratios are such that each movement of the belt will advance all trays a distance equal to the spacing between trays. Thus, as the tray sections 34 advance to successive stations, an operator at each station may place the required number of bills in the tray in front of him, or an automatic loading mechanism may accomplish this task.

After the tray has left its final loading position, indicated at 45 in Figure 2, it enters the wrapping section 22 of the machine where a band 37 is placed around it. For this purpose the front of the wrapping section is provided with an access opening 46 through which the loaded trays enter. In general, the wrapping section includes a band transfer mechanism generally indicated at 47, a band deflecting mechanism generally indicated at 48, a band folding mechanism generally indicated at 49, and a band sealing mechanism generally indicated at 51. These four mechanisms operate in sequence to wrap a band firmly around each package, the entire cycle taking place within the time allotted before the belt is again advanced.

Figure 4:
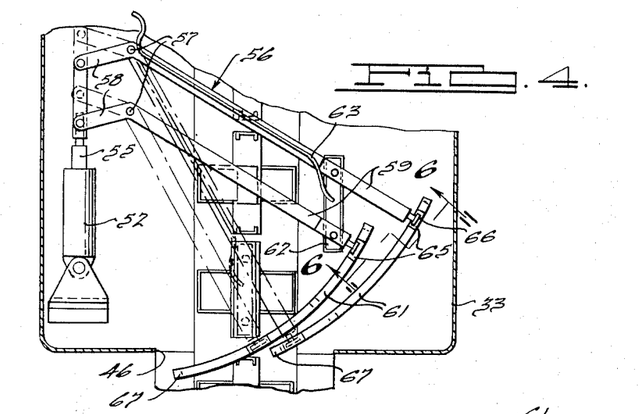
Figure 4 is a fragmentary plan view taken along the line 4—4 of Figure 5 and showing the various positions of the band transfer mechanism with respect to the conveyor.
Figure 6:
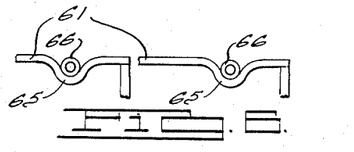
Figure 6 is a fragmentary elevational view taken along the line 6—6 of Figure 4 and showing those portions of the tracks which permit the band transfer mechanism to engage the stack of bands.

Band transfer mechanism 47 is best seen in Figures 2, 3 and 4 and comprises a cylinder 52 mounted within housing 33 on one side thereof. One end of cylinder 52 is supported on a vertical pivot 53 by a bracket 54 within housing 33. A piston 55 extends rearwardly from cylinder 52 and has connected thereto a pair of bell crank-shaped levers 56. These levers are each pivoted at 57 for parallel operation by means of piston 55, the shorter arms 58 of the levers being pivotally connected to the piston rod. The outer ends of longer arms 59 of the levers ride on a pair of arcuate tracks 61 disposed within housing 33, and these arms also carry a band pickup member 62 which moves parallel to itself during movement of the levers, as seen in Figure 4. A pneumatic tube 63 is connected to pickup member 62 for providing conventional suction means to pick up individual bands 37. Pickup member 62 is adapted to move between a pickup position shown in solid lines in Figure 4 and a releasing position shown in dot-dash lines. In the pickup position member 62 is above a stackholder 64 which holds bands 37, whereas in the releasing position member 62 is directly above an aperture 35 in belt 27, at the wrapping station. Tracks 61 are provided with the depressed portions 65 shown in Figure 6, which receive rollers 66 carried by the outer ends of arms 59 when the linkage reaches either of its positions. In this manner pickup member 62 is allowed to drop into position to pick up or release a band 37. The forward ends 67 of tracks 61 are accommodated by opening 46 as seen in Figure 4.

The band deflecting mechanism 48 serves to deflect downwardly the ends 68 and 69 of band 37 after it has been placed on the stack of bills, as seen in Figure 7. Wrapping section 22 has an upwardly extending housing portion 71 at the forward end thereof within which the band deflecting mechanism is disposed. Housing portion 71 may be provided with front and rear windows 72 and 73 respectively if desired. A cylinder 74 is vertically disposed within housing 71 and is secured thereto by brackets 75. The lower end of piston rod 76 of the cylinder carries a forked member 77 having downwardly extending and slightly flared deflectors 78 curved outwardly at their lower ends. The spacing between deflectors 78 at their upper ends is approximately equal to the width of bills 36 plus the thickness of a band, with the bills in slightly curved position as shown in Figure 7. Deflectors 78 are provided with clearance apertures 79 to accommodate band folding mechanism 49 as described below. Cylinder 74 is adapted to move member 77 between an upper position clear of arms 59, as seen in Figure 2, and a lower position seen in Figure 7 in which ends 68 and 69 of band 37 are deflected into a downwardly extending position. It will be noted that due to the curved nature of member 77, which is complementary to the curvature of the tray bottoms, it will hold the money in curved relation against the curved bottoms of tray sections 34, the curvature being in the direction of the short axis of the stack. It will also be observed that aperture 35 in belt 27 and a matching aperture 80 in bed plate 28 will permit the ends 68 and 69 of band 37 to move freely into their downward position and will allow free movement of deflectors 78.

Band folding mechanism 49 functions to fold ends 68 and 69 of band 37 into overlapping relation on the underside of the money package. It will be noted that this requires that either end 68 or 69 of the band be folded under before the other end so that no interference will occur. In the present embodiment, as best seen in Figures 2 and 7, the mechanism, which is disposed between the upper and lower runs of belt 27, comprises a cylinder 81 within housing 26 and supported on a horizontal pivot 82 by a bracket 83 at its forward end. Piston rod 84 extends rearwardly and carries at its outer end a pair of links 85 and a link 86 on a common pivot 87, the axis of which is parallel to that of pivot 82. The outer end of links 85 are pivotally connected at 87 to a lever 88 which is supported on a stationary pivot 89 carried by housing 26. The outer end of link 86 is pivoted at 91 to the intermediate portion of a lever 92 which is connected at one end to pivot 89. The upper ends of levers 88 and 92 carry fingers 93 and 94 respectively, and these fingers are adapted to pass through apertures 79 of deflectors 78 when the levers are swung to their upper positions. In doing so, finger 93 engages end 68 of band 37 while finger 94 engages end 69, the movement being such as to fold these ends inwardly under the stacked bills 36. It will be noted that when in their operative position fingers 93 and 94 are spaced apart a predetermined distance, this spacing being provided for sealing mechanism 51 as will hereinafter appear.

Means are provided for causing lever 88 to swing from its lower position, shown in solid lines in Figure 7, to its upper position before lever 92 swings to its upper position shown in double dot-dash lines. In this manner end 68 of the band is folded under the stack before end 69 so that overlapping occurs without interference. In the illustrated embodiment, a coil spring 95 is connected between a stationary bracket 96 and lever 92, for example at pivot 91, this spring being in tension even when lever 92 is in its lower position. With piston rod 84 retracted lever 92 is held in its lower position by spring 95 against a stationary stop 97, and lever 88 is likewise held in its lower position because of the arrangement of the linkage. When piston rod 84 starts to extend, lever 88 will be swung upwardly into its dot-dash position, but lever 92 will be held against stop 97 by spring 95. During this movement cylinder 81 will swing downwardly about pivot 82. When lever 88 has reached the position shown in dot-dash lines its lower end engages a stationary stop 98 so that further movement of lever 88 is prevented. At this point end 68 of band 37 has been swung upwardly as shown by arrow 99 in Figure 7. Further extending movement of piston rod 84 will result in lever 92 being swung upwardly against the resistance of spring 95 until the position shown in double dot-dash lines is reached. At this point end 69 of band 37 will be swung upwardly as shown by arrow 101 in Figure 7. It will therefore be seen that ends 68 and 69 are caused to move into overlapping relation by virtue of the linkage arrangement, and that the band ends will be so held as long as piston rod 84 is extended. It should also be observed that aperture 35 in belt 27 and aperture 80 in bed plate 28 will permit fingers 93 and 94 to engage band 37.

Figure 5:
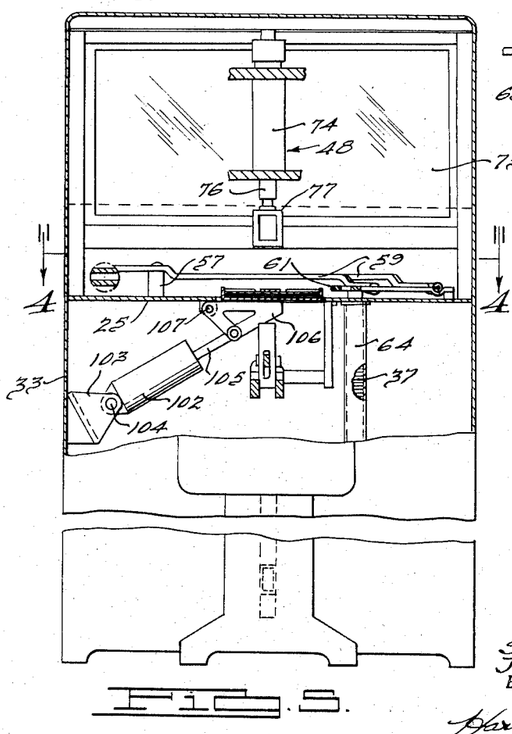
Figure 5 is a front elevational view partly in cross section along the line 5—5 of Figure 3 and showing portions of the tracks for the band transfer mechanism.
Figure 8:
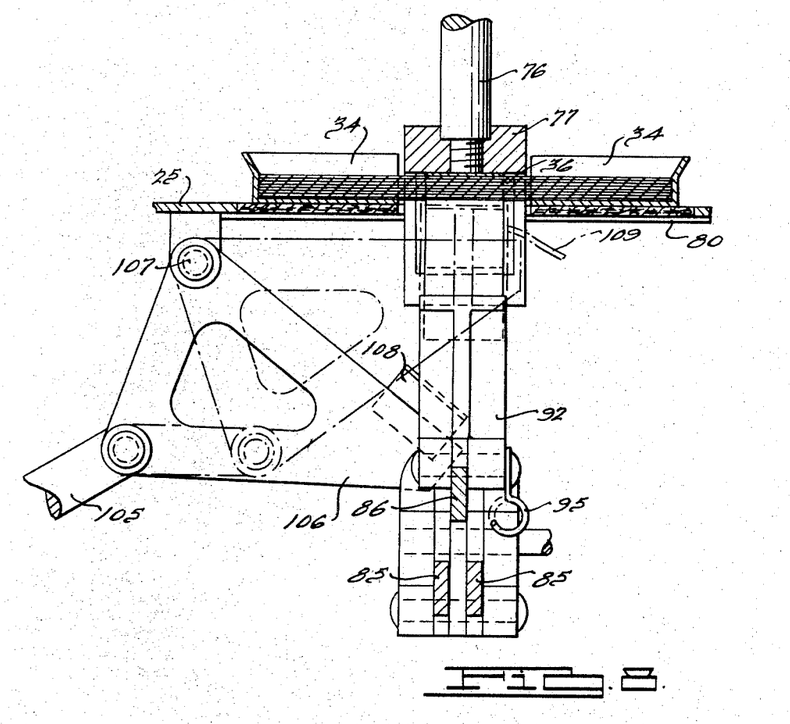
Figure 8 is a detailed elevational view of the wrapping elements of the machine including the band deflecting mechanism, the band folding mechanism and the band sealing mechanism.
Figure 9:
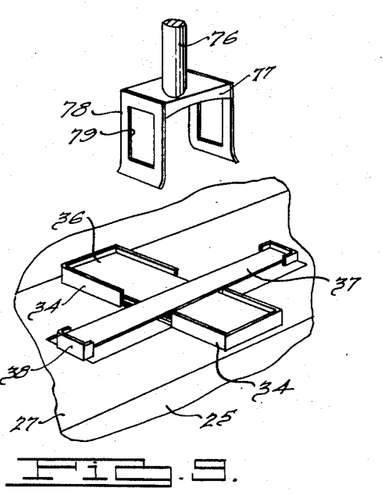
Figure 9 is a schematic view in perspective showing the position of the band prior to wrapping.

Band sealing mechanism 51 serves to seal the overlapping ends 68 and 69 of band 37, and in the present embodiment a heating means is shown for sealing bands carrying a heat-responsive adhesive. The mechanism, as best shown in Figures 5 and 8, comprises a cylinder 102 within housing 33 pivotally supported on one end by a bracket 103 carrying a pivot 104. The outer end of piston rod 105 is pivotally connected to a carrier 106 which is pivotally supported at 107 to the underside of top 25 of the housing adjacent opening 80 in bed plate 28. A heating member 108 is carried by the upper end of carrier 106, and the carrier is adapted to move between a lower position as shown in solid lines in Figure 8 in which heating member 108 is retracted, and an upper position shown in dot-dash lines in which the heating member is pressed against the overlapping band ends 68 and 69. Heating member 108 is adapted to supply heat, for example by means of a wiring connection 109, to the overlapping band ends so that the heat-responsive adhesive will take effect. It should be noted that when in its retracted position heating member 108 and its carrier 106 are out of interfering relation with deflecting mechanism 48 and band folding mechanism 49, and that the spacing of fingers 93 and 94 permits heating member 108 to reach its operative position. It should also be observed that when pressed against the underside of the package, heating member 108 will be held against further movement by forked member 77 which is still in its downward position. The upper surface of heating member 108 is preferably curved so as to conform with the shape of the package as determined by the tray and member 77.

Figure 10:
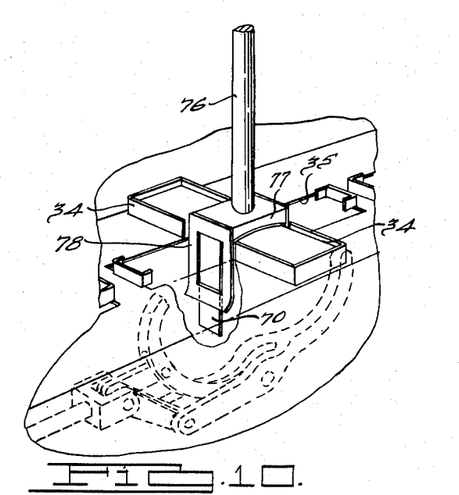
Figure 10 is a similar view showing the ends of the band deflected into the first position.
Figures 11, 12, 14:
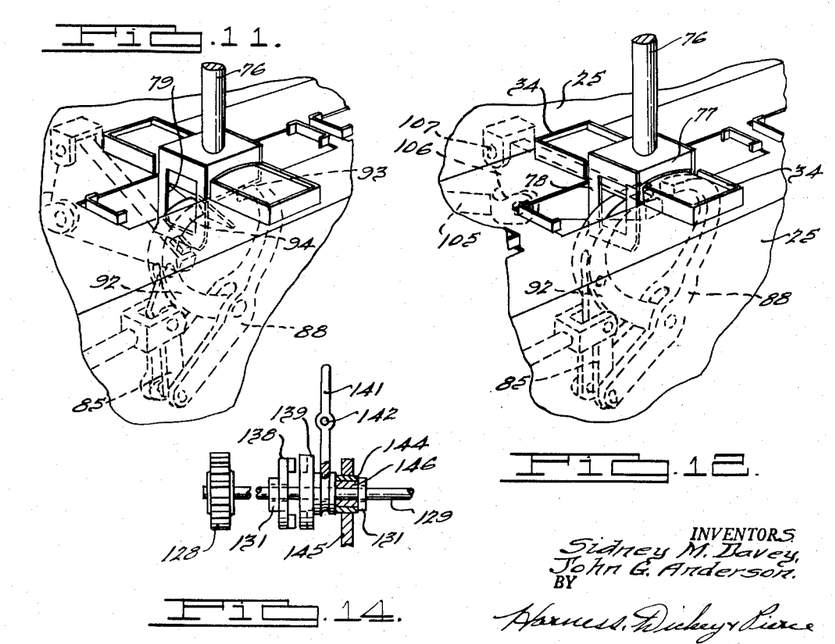
Figure 11 is a view showing the band folding mechanism after partially completing its motion.
Figure 12 shows the band sealing member in its final position.
Figure 14 is a detailed elevational view of the clutch mechanism used to operate the automatic loader.

The operation of the wrapping mechanism may perhaps best be understood by examination of Figures 9-12 which show in schematic fashion the sequential operations of a cycle. Starting with Figure 9, a band 37 is shown as having been placed over the stacked bills between guides 38. Forked member 77 is poised above the assembly and in Figure 10 is shown as having descended with deflectors 78 forming band ends 68 and 69 downwardly through apertures 35 and 80 in belt 27 and bed plate 28 respectively. It will be noted that the engagement of forked member 77 with the stack causes it to assume the curved shape shown in Figure 10. Band folding mechanism 49 then functions in the manner shown in Figures 10 and 11, with finger 93 first engaging band end 68 and finger 94 thereafter engaging band end 69. During this movement the fingers pass through apertures 79 in deflectors 78. With the band folding mechanism in operative position carrier 106 is swung upwardly as shown in Figure 12 so that heating element 108 engages the overlapping band ends. The band is thus snugly wrapped around the stack and extends in the direction of the slight curvature, that is, in the direction of the short axis of the stack.

After the band has been sealed the deflecting mechanism, band folding mechanism and band sealing mechanism are all moved to their retracted positions so that the belt may advance. Appropriate fluid controls of a conventional nature may of course be provided for operating the various mechanisms in sequence to perform their functions. As stated previously, the timing is such that sealing of the band is accomplished within the time in which the belt is held stationary.

After leaving the wrapping station the wrapped packages are fed past a counter 111 mounted within housing 33 and are dropped off onto a ramp 112 which guides them to a trough 113 in which they are collected. A window 114 may be provided in the top of housing 33 for viewing the mechanism. It will be understood that if desired additional checking devices (not shown) such as a standard device for measuring thickness of each bundle could be used.

The result of sealing each band 37 when the stacked bills are in a curved condition is to cause the bills to be tightly bound. This is apparent when it is considered that the flattening of each stack after wrapping will cause band 37 to become taut, firmly gripping the bills to prevent their slipping out of the package. The stack will of course tend to flatten because of its inherent resiliency upon release from its restrained condition.

As stated previously, an automatic loading mechanism 23 may be provided if desired at loading section 21. It will be noted that in the absence of such an automatic loading mechanism the arrangement is extremely convenient for operators who stand alongside loading section 21 and drop bills as required into the trays as they reach each operator's station. A preferred automatic loading mechanism is shown in detail in Figures 1 and 13-17 and comprises a housing 115 mounted on housing 26 and having a plurality of loading stations along loading section 21. These loading stations are each adjacent a stop point for the trays, and means are provided at each station for storing a stack of bills of specified denomination and loading such bills individually onto the trays as they reach the station. Each station is provided with a bin 116 within housing 115, this bin being hingedly connected at 117 to the bottom of the housing and swingable outwardly therefrom. Bin 116 is adapted to hold bills in stacked relation, and a door 118 hinged at 119 to housing 115 may be opened outwardly to permit filling of the bin. The bin may be provided with conventional means (not shown) for lifting a stack of bills held therein as bills are removed from the top. Means are also provided for maintaining the stacked bills in non-adhering relation, and in the present embodiment this means includes a blower 121 within housing 115 which supplies compressed air to a conduit 122 extending along housing 115 beneath bins 116. Each bin is provided with a conduit 123 extending therealong, this conduit being connectible with conduit 122 when the bin is in operative position by virtue of an aperture 124 in conduit 122 which is aligned with conduit 123. Bin 116 is preferably provided with a plurality of perforations 125 which permit escape of the air supplied under pressure from conduit 123, the latter being open on the side facing the interior of the bin. The gentle current of air thus produced within each bin 116 will prevent adhering of the bills which might result in lifting two or more at a time from the stack.

The transfer means for carrying the bills individually from each stack to its adjacent tray is actuated by a cylinder 126 disposed within housing 115. The arrangement is such that the transfer means at each automatic loading station may be connected or disconnected at will so that the transfer mechanism may be stopped at loading stations which are not needed for the particular package being assembled. Cylinder 126 operates a vertically reciprocating rack 127 which meshes with a pinion 128 on a shaft 129. This shaft extends past all loading stations, and adjacent each bin 116 the shaft has connected thereto by means later described a pair of arms 131. A pickup plate 132 is pivotally connected to the outer ends of arms 131, plate 132 having the conventional air connection 133 for pickup purposes. A pair of arms 134 are pivoted at one end 135 to housing 115 and at their other end to plate 132, as shown at 136. The arrangement is such that when shaft 129 is rotated arms 131 and 134 will swing in parallel relation to move plate 132 between a pickup position shown in dot-dash lines in Figure 13 and a release position shown in solid lines immediately above a tray. Windows 137 may be provided in housing 115 adjacent each loading station so that the transfer mechanism may be observed.

Figure 15:
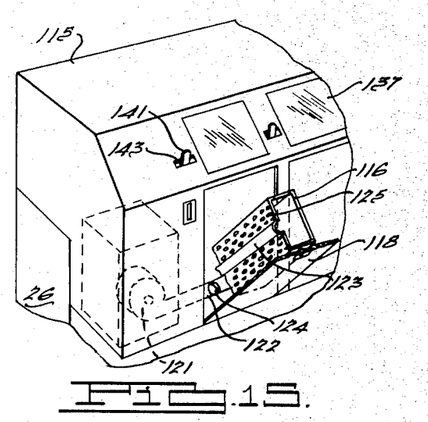
Figure 15 is a schematic perspective view showing the stack holder for a station of the automatic loading means with a blower arrangement for maintaining the bills in separated condition.

The means for selectively disconnecting the transfer mechanism at each loading station comprises a clutch connection between each pair of arms 131 and shaft 129. This clutch connection is shown in Figure 14 wherein it will be seen that both arms 131 are freely mounted on shaft 129, one such arm having fixed thereto a dog clutch element 138. A second dog clutch element 139 is slidably and non-rotatably mounted on shaft 129 and is operable by shifter fork means comprising a forked lever 141 pivoted at 142 to housing 115. Lever 141 extends through a slot 143 adjacent window 137 as seen in Figure 15, and movement of this lever causes clutch element 139 to move between a disengaged position against a stop 144, as shown in Figure 14, and a position in engagement with clutch element 138. Stop 144, which is supported by a bracket 145 within housing 115, may also serve as a support for a shaft bearing 146.

Figures 13, 17:
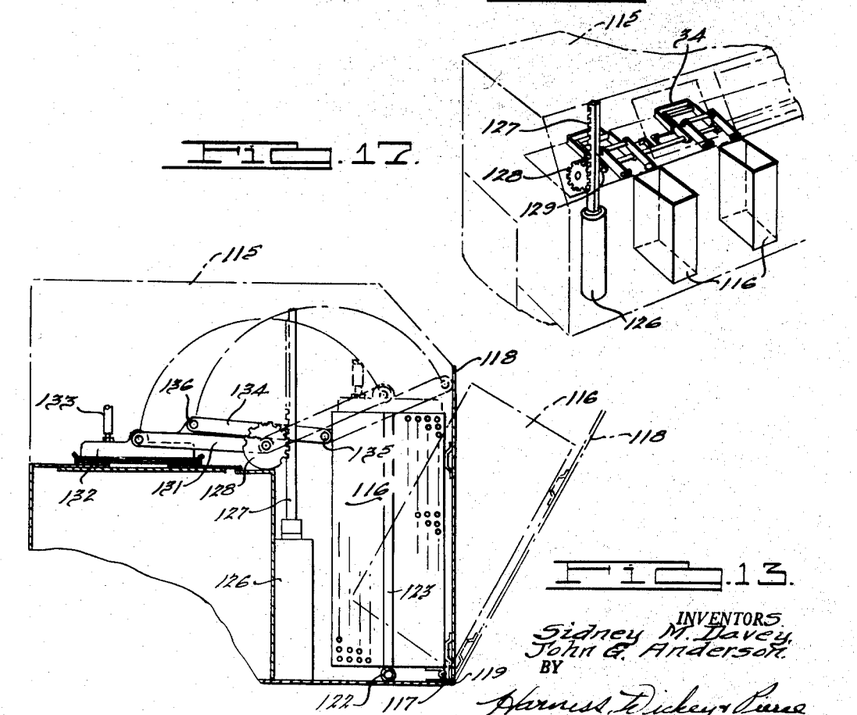
Figure 13 is a side elevational view in cross section of a preferred form of automatic loading device for the packaging machine.
Figure 17 is a view with the transfer mechanism adjacent the package trays, parts being omitted for clarity.
Figure 16:
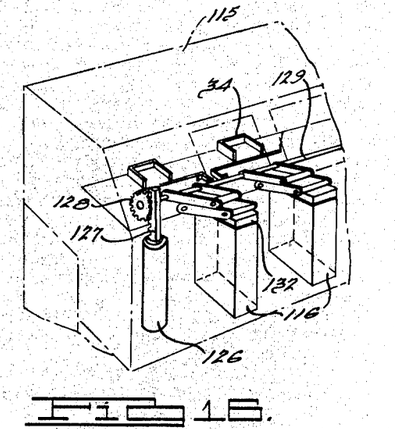
Figure 16 is a similar view of the automatic loading device with the transfer mechanism adjacent the stack of bills.

The operation of the automatic loading mechanism is shown sequentially in Figures 15–17. As shown in Figure 15, door 118 and bin 116 are first swung outwardly so that the bin may be loaded with bills. The bin and door are then swung inwardly so that conduit 123 is connected with conduit 122 to supply a gentle current of air through the stack to prevent adhesion of the bills. The transfer mechanism adjacent those bins which are not being used are disconnected by appropriate levers 141 to disengage clutch elements 138 and 139. As each tray reaches a station, cylinder 126 is operated to move rack 127 downwardly, thus rotating shaft 129 clockwise as seen in Figure 16. This movement causes pickup plates 132 to be disposed above their respective bins and a single bill is picked up. Cylinder 126 is then operated to raise rack 127, and plates 132 are swung to a position over the trays where the bills are released. The pickup plates are then returned to their original position and the trays are advanced one station.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a machine for packaging paper money or the like, an elongated loading section having a plurality of stations, a conveyor movable along said loading section, means for moving said conveyor in intermittent steps, a plurality of trays carried by said conveyor and movable to successive stations, each tray comprising two sections spaced from each other in a transverse direction, an aperture in said conveyor adjacent each tray between the sections thereof, a wrapping station at one end of said loading section, means at said wrapping station for storing in a plurality of bands of flat shape, transfer means for moving bands successively into position across the contents of each tray as it arrives at said wrapping station, a forked member disposed above said wrapping station and movable between a retracted position and a lower position deflecting the ends of said band downwardly through said aperture, a band folding mechanism comprising a pair of fingers movable successively into engagement with said downwardly deflected band ends to cause said ends to overlap under said tray contents, and means engageable with said overlapped band ends to seal the ends and form a package.

2. The combination according to claim 1, said band transfer means including a pair of oscillating arms and a pickup member carried by the outer ends of said arms.

3. The combination according to claim 2, further provided with a pair of tracks, rollers carried at the outer ends of said arms and movable along said tracks, and depressions in said tracks adjacent said band storing means and adjacent said wrapping station, said arms being movable downwardly when said rollers reach said depressions.

4. The combination according to claim 1, said sealing means comprising a heating member swingably mounted adjacent said wrapping station, and means for moving said heating member between a retracted position and an operative position against said overlapped band ends.

5. The combination according to claim 1, further provided with actuating means for said fingers, said actuating means comprising a pair of levers on a common pivot and carrying said fingers, reciprocable actuating means, a link pivotally connecting one end of one of said levers and said reciprocable means, a second link pivotally connecting an intermediate portion of said other lever and said reciprocable means, spring means for restraining the movement of said second lever when said reciprocable means is moved in one direction, and a stop for limiting the movement of said first lever when the reciprocable means is moved in said one direction, whereby continued movement of said reciprocable means will move said second lever.

6. The combination according to claim 1, the opposite sides of said forked member having apertures therein, whereby said fingers may pass through said last-mentioned apertures when engaging said band.

7. The combination according to claim 1, further provided with band guide members fixed to said conveyor at the opposite ends of each of said apertures.

8. In a machine for packaging paper money and the like, a loading section having a plurality of stations therealong, a conveyor movable along said loading section, a plurality of trays carried by said conveyor, each of said trays having two sections transversely spaced, means for moving said conveyor in intermittent steps so as to move said trays to successive stations, an aperture in said conveyor at each of said trays between said tray sections, a housing at one end of said loading section, a wrapping station within said housing, means within said housing for storing a plurality of flat bands in stacked relation, transfer means for placing bands successively across the tops of the stacked contents of said trays so as to extend longitudinally, a forked member having a central portion engageable with the central portion of a positioned band and side portions engageable with the end of said band to deflect them downwardly through said conveyor aperture, apertured portions in the side portions of said forked member, a pair of fingers disposed beneath said conveyor at said wrapping station, means for moving said fingers into successive engagement with said band ends, said fingers being movable through the apertures in said forked member to an operative position spaced from each other and holding said band ends in overlapping relation, a sealing member movable upwardly between said spaced fingers while in their operative position to engage said overlapping band ends and force them into sealing relation, and means in said housing for collecting successive packages as they leave said wrapping station.

9. In a machine for packaging paper money or the like, means for holding the money in a stack, means for placing a flat band across the top of said stack, means for deflecting the ends of said band downwardly, a first lever pivoted at an intermediate portion adjacent said holding means, a second lever pivoted at one end, fingers carried by said levers, each lever being movable toward and away from the other between a retracted position and an operative position engaging one of said band ends, reciprocable actuating means, a link connecting one end of said first lever and said actuating means, a second link connecting an intermediate portion of said second lever and said actuating means, movement of said actuating means in one direction urging said levers toward their operative position, resilient means restraining said second lever from such movement during the first portion of movement of said actuating means, and a stop for limiting movement of said first lever when it has reached its operative position, whereby continued movement of said actuating means will cause movement of said second lever toward its operative position.

10. In a machine for packaging paper money or the like, an elongated loading section having a plurality of stations, a conveyor movable along said loading section, means for moving said conveyor, a plurality of trays carried by said conveyor and movable to successive stations, each tray comprising two sections spaced from each other in a transverse direction, an aperture in said conveyor adjacent each tray between the sections thereof, a wrapping station at one end of said loading section, means at said wrapping station for storing a plurality of bands of flat shape, transfer means for moving bands successively into position across the contents of each tray as it arrives at said wrapping station, a forked member disposed above said wrapping station and movable between a retracted position and a lower position deflecting the ends of said band downwardly through said aperture, a band folding mechanism comprising a pair of fingers movable successively into engagement with said downwardly deflected band ends to cause said ends to overlap under said tray contents, and means engageable with said overlapped band ends to seal the ends and form a package.

11. In a mechanism for packaging paper money or the like, an elongated loading section, a conveyor movable along said loading section in intermittent steps, a plurality of trays movable with said conveyor, each of said trays comprising two separated sections, said trays being positioned at successive stations of said loading section during said intermittent movement, a wrapping station at one end of said loading section, means for placing a flat band so as to lie across the bills in each tray as it reaches said wrapping station, deflecting means for bending the opposite ends of said band downwardly, an apertured portion in said conveyor between said sections, whereby the ends of said band may pass through said apertured portion, means for additionally bending the ends of said band successively upwardly so as to be in overlapping relation under said bills, and sealing means engagebale with said overlapped ends.

12. The combination according to claim 11, said deflecting means comprising a forked member movable downwardly through said apertured portion to deflect the ends of said band.

13. In a mechanism for packaging paper money or the like, an elongated loading section, a conveyor movable along said loading section in intermittent steps, a plurality of trays movable with said conveyor, the bottoms of said trays being slightly convex upwardly, said trays being positioned at successive stations of said loading section during said intermittent movement, a wrapping station at one end of said loading section, means for placing a flat band so as to lie across the bills in each tray as it reaches said wrapping station, deflecting means for bending the opposite ends of said band downwardly, said deflecting means comprising a forked member engageable with the opposite ends of said band, the central portion of said forked member being slightly concave to conform to the shape of said tray, whereby the bills will be held in a slightly curved shape during wrapping, means for additionally bending the ends of said band successively upwardly so as to be in overlapping relation under said bills, and sealing means engageable with said overlapped ends.

14. In a mechanism for packaging paper money or the like, an elongated loading section having a plurality of stations, means for storing bills at each of said stations in readiness for loading, a conveyor movable along said loading section in intermittent steps, a plurality of trays movable with said conveyor, said trays being positioned at successive stations of said loading section during said intermittent movement, whereby each tray may be selectively loaded with bills from each of said storing means, a wrapping station at one end of said loading section, means for placing a flat band so as to lie across the bills in each tray as it reaches said wrapping station, deflecting means for bending the opposite ends of said band downwardly, means for additionally bending the ends of said band successively upwardly so as to be in overlapping relation under said bills, and sealing means engageable with said overlapped ends.

15. In a mechanism for packaging paper money or the like, an elongated loading section having a plurality of stations, means for storing bills at each of said stations in readiness for loading, a conveyor movable along said loading section, a plurality of trays movable with said conveyor, said trays being positioned at successive stations of said loading section, whereby each tray may be selectively loaded with bills from each of said storing means, a wrapping station at one end of said loading section, means for placing a flat band so as to lie across the bills in each tray as it reaches said wrapping station, deflecting means for bending the opposite ends of said band downwardly, means for additionally bending the ends of said band successively upwardly so as to be in overlapping relation under said bills, and sealing means engageable with said overlapped ends.

16. In a mechanism for packaging paper money or the like, an elongated loading section having a plurality of stations, means for storing bills at each of said stations in readiness for loading, a conveyor movable along said loading section, a plurality of trays having bottom apertures movable with said conveyor, said trays being positioned at successive stations of said loading section during said movement, whereby each tray may be selectively loaded with bills from each of said storage means, a wrapping station at one end of said loading section, means for placing a flat band so as to lie across the bills in each tray as it reaches said wrapping station with the ends of the band above said bottom apertures, deflecting means for bending the opposite ends of said band downwardly through said bottom apertures, means for additionally bending the ends of said band successively upwardly so as to be in overlapping relation under said bills, and sealing means engageable with said overlapped ends.

17. In a mechanism for packaging paper money or the like, an elongated loading section having a plurality of stations, means for storing bills at each of said stations in readiness for loading, a conveyor movable along said loading section, a plurality of trays movable with said conveyor, said trays being positioned at successive stations of said loading section, whereby each tray may be selectively loaded with bills from each of said storing means, a wrapping station at one end of said loading section, means for placing a flat band so as to lie across the bills in each tray as it reaches said wrapping station, deflecting means for bending the opposite ends of said band in one direction, means for additionally bending the ends of said band successively in the opposite direction so as to be in overlapping relation against said bills, and sealing means engageable with said overlapped ends.

18. In a mechanism for packaging paper money or the like, an elongated loading section having a plurality of stations, means for storing bills at each of said stations in readiness for loading, a conveyor movable along said loading section, a plurality of trays having bottom apertures movable with said conveyor, said trays being positioned at successive stations of said loading section during said movement, whereby each tray may be selectively loaded with bills from each of said storage means, a wrapping station at one end of said loading section, means for placing a flat band so as to lie across the bills in each tray as it reaches said wrapping station with the ends of the band aligned with said bottom apertures, deflecting means for bending the opposite ends of said band in one direction through said bottom apertures, means for additionally bending the ends of said band successively in the opposite direction so as to be in overlapping relation against said bills, and sealing means engageable with said overlapped ends.

References Cited in the file of this patent

UNITED STATES PATENTS

| | | |
|---|---|---|
| 566,540 | Schloss | Aug. 25, 1896 |
| 1,190,848 | Batdorf | July 11, 1916 |
| 1,204,118 | Batdorf | Nov. 7, 1916 |
| 1,261,612 | Powers | Apr. 2, 1918 |
| 2,502,374 | Gilowitz | Mar. 28, 1950 |
| 2,542,089 | Leifer | Feb. 20, 1951 |
| 2,558,685 | Honig | June 26, 1951 |
| 2,612,737 | Thielens | Oct. 7, 1952 |